US010884882B2

(12) United States Patent
Bingo et al.

(10) Patent No.: US 10,884,882 B2
(45) Date of Patent: Jan. 5, 2021

(54) SEMICONDUCTOR DEVICE INCLUDING SEMAPHORE MANAGEMENT

(71) Applicant: RENESAS ELECTRONICS CORPORATION, Tokyo (JP)

(72) Inventors: Hidekazu Bingo, Tokyo (JP); Koji Adachi, Tokyo (JP); Yoichi Yuyama, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 156 days.

(21) Appl. No.: 16/121,327

(22) Filed: Sep. 4, 2018

(65) Prior Publication Data

US 2019/0102268 A1    Apr. 4, 2019

(30) Foreign Application Priority Data

Oct. 4, 2017  (JP) ................................. 2017-194248

(51) Int. Cl.
| | | |
|---|---|---|
| *G06F 11/00* | (2006.01) | |
| *G06F 11/20* | (2006.01) | |
| *G06F 9/455* | (2018.01) | |
| *G06F 9/52* | (2006.01) | |

(52) U.S. Cl.
CPC ...... *G06F 11/2033* (2013.01); *G06F 9/45558* (2013.01); *G06F 9/526* (2013.01); *G06F 2009/45575* (2013.01); *G06F 2009/45579* (2013.01); *G06F 2201/85* (2013.01)

(58) Field of Classification Search
CPC .... G06F 11/3037; G06F 2/468; G06F 2/5022; G06F 9/468; G06F 9/5022
See application file for complete search history.

(56) References Cited

U.S. PATENT DOCUMENTS

| | | | |
|---|---|---|---|
| 6,757,769 B1 * | 6/2004 | Ofer ....................... | G06F 9/524 |
| | | | 710/200 |
| 6,792,497 B1 | 9/2004 | Gold et al. | |
| 2002/0052959 A1 * | 5/2002 | Freitas ................... | G06F 9/526 |
| | | | 709/226 |

(Continued)

OTHER PUBLICATIONS

Extended European Search Report issued in corresponding European Patent Application No. 18195623.6-1209, dated Feb. 14, 2019.

*Primary Examiner* — Christopher S McCarthy
(74) *Attorney, Agent, or Firm* — McDermott Will & Emery LLP

(57) ABSTRACT

A semiconductor device includes a common resource commonly used by plural processes executed on a processor, a semaphore controlling the possessory right of the common resource, and a semaphore management unit performing a process of acquiring the possessory right of the common resource to the semaphore in response to a request of a process performed on the processor. When a request to acquire the possessory right of the common resource is received from a first process in the plural processes and the possessory right cannot be obtained, the semaphore management unit switches the process executed on the processor to a second process, repeatedly performs a process of acquiring the possessory right requested by the first process to the semaphore and, when the possessory right requested by the first process is obtained, switches the process on the processor from the second process to the first process.

6 Claims, 6 Drawing Sheets

(56) References Cited

U.S. PATENT DOCUMENTS

| | | | | |
|---|---|---|---|---|
| 2002/0087769 A1* | 7/2002 | McKenney | ............... | G06F 9/52 710/200 |
| 2010/0031254 A1* | 2/2010 | Chin | ................... | G06F 9/45533 718/1 |
| 2014/0351825 A1 | 11/2014 | Xu et al. | | |

* cited by examiner

SEMICONDUCTOR DEVICE INCLUDING SEMAPHORE MANAGEMENT

CROSS-REFERENCE TO RELATED APPLICATIONS

The disclosure of Japanese Patent Application No. 2017-194248 filed on Oct. 4, 2017 including the specification, drawings and abstract is incorporated herein by reference in its entirety.

BACKGROUND

The present invention relates to a semiconductor device and, for example, relates to a semiconductor device having a common resource which is commonly used by a plurality or processes.

In recent years, in a semiconductor device such as a processor executing a program, processes are performed in parallel by using a method such as use of a plurality of arithmetic cores or logical configuration of a virtual machine on a single arithmetic core. In a semiconductor device performing a parallel process, there is a case that a single resource (for example, a memory, a DAC, a timer, or the like) is commonly used by a plurality of processes. The resource commonly used will be called a common resource. In the case of using the common resource, when the common resource is used without limitation by a plurality of processes, there is the possibility that a process result generated by a single process is destroyed by another process, or another process operates based on a process result of a single process and an erroneous operation occurs. Consequently, in the case of using the common resource, to avoid operation interference among processes, a common resource exclusion control is performed. U.S. Pat. No. 6,792,497 (patent literature 1) discloses an example of the exclusion control on a supply resource.

In the patent literature 1, two virtual machines are configured on a single processor, and the two virtual machines access a single common resource. In the patent literature 1, the exclusion control for the common resource is performed by using semaphore performing the common resource exclusion control.

SUMMARY

However, the technique described in the patent literature 1 has a problem such that, although the exclusion control for the common resource can be performed, the use efficiency of the common resource set so as to be exclusively accessed is low, and the process capability of the semiconductor device cannot be fully displayed.

The other problems and novel features will become apparent from the description of the specification and appended drawings.

According to an embodiment, a semiconductor device includes: a common resource commonly used in a plurality of processes executed on a processor; a semaphore controlling the possessory right of the common resource; and a semaphore management unit performing a process of obtaining the possessory right of the common resource for the semaphore in response to a request of the process being performed on the processor. When a request to acquire the possessory right of the common resource is received from a first process in the plurality of processes and the possessory right cannot be obtained, the semaphore management unit performs a control of switching the process executed on the processor to a second process and repeatedly performs the possessory right acquiring process requested by the first process. When the possessory right requested by the first process is obtained, the semaphore management unit performs a control of switching the process executed on the processor from the second process to the first process.

According to the embodiment, the processing efficiency of a virtual machine is increased and the processing capability of the semiconductor device can be increased.

DETAILED DESCRIPTION

Figure 1:
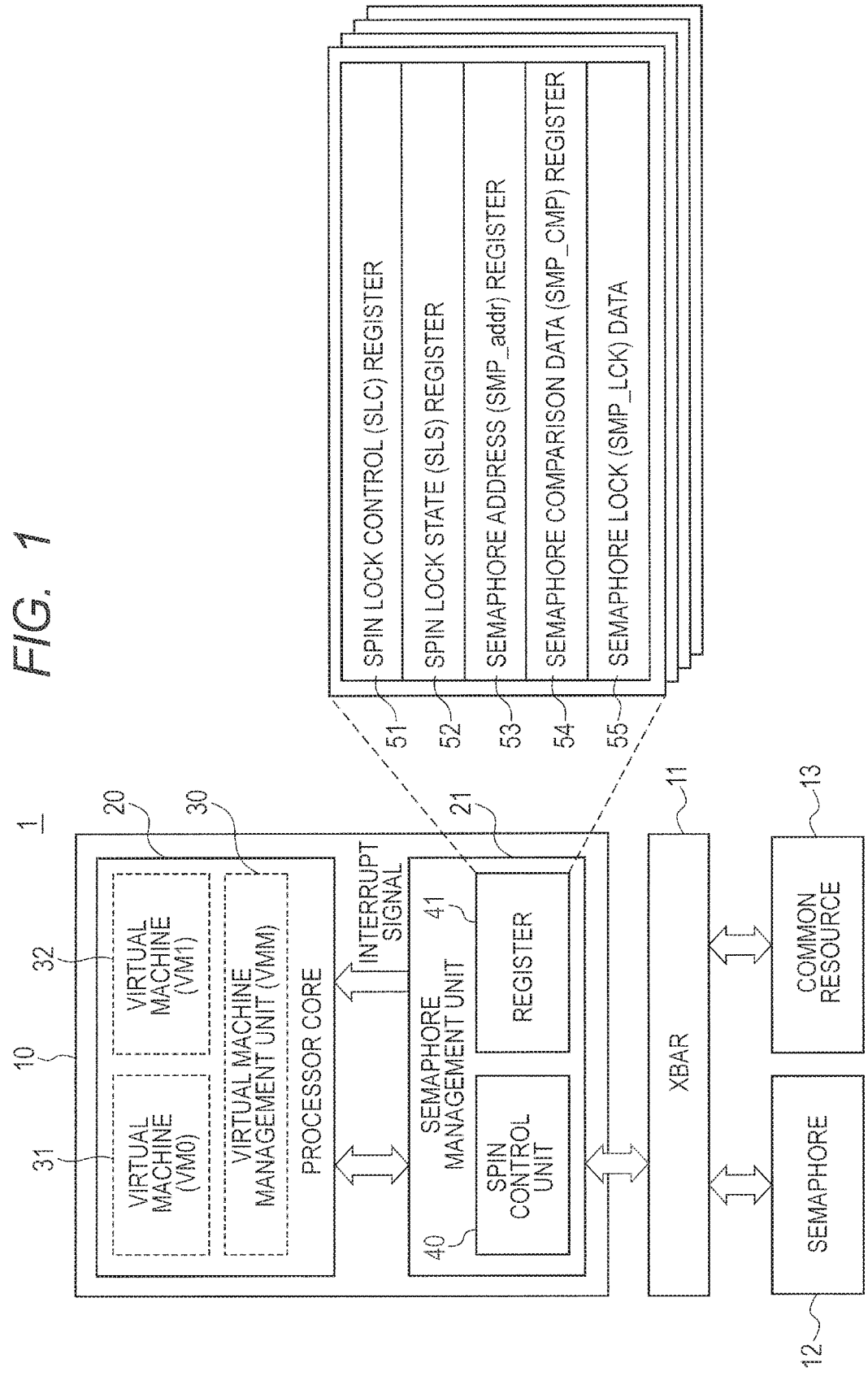
FIG. 1 is a block diagram of a semiconductor device according to a first embodiment.

To make description clear, omission and simplification is properly made in the following description and the drawings. Elements illustrated in the drawings as function blocks performing various processes can be comprised of a CPU, a memory, and other circuits as hardware and realized by a program loaded to a memory or the like as software. Therefore, a person skilled in the art understands that those function blocks can be realized in various forms by hardware only, software only, or combination of hardware and software and are not limited to any of them. In the drawings, the same reference numeral is assigned to the same component and repetitive description is omitted as necessary.

The above-described program is stored by using any of non-transitory computer readable media of various types and can be supplied to a computer. The non-transitory computer readable media include tangible storage media of various types. Examples of the non-transitory computer readable media include magnetic recording media (for example, flexible disk, magnetic tape, and hard disk drive), magnet-optic recording media (for example, magnet-optic disk), CD-ROM (Read Only Memory), CD-R, CD-R/W, and semiconductor memories (for example, mask ROM, PROM (Programmable ROM), EPROM (Erasable PROM), flash ROM, and RAM (Random Access Memory)). The program may be supplied to a computer by any of transitory computer readable media of various types. Examples of the transitory computer readable media include an electric signal, an optical signal, and an electromagnetic wave. The transitory computer readable medium can supply a program to a computer via a wired communication path such as an electric wire or an optical fiber or a wireless communication path.

First Embodiment

FIG. 1 is a block diagram of a semiconductor device 1 according to a first embodiment. As illustrated in FIG. 1, the semiconductor device 1 according to the first embodiment has a processor unit 10, a crossbar switch 11, a semaphore 12, and a common resource 13. Although a single common resource is illustrated as a common resource in FIG. 1, alternatively, a plurality of common resources may be provided.

The processor unit 10 is, for example, an arithmetic unit executing a program stored in an internal memory (not illustrated) or an external storage device (not illustrated). The crossbar switch 11 switches the processor unit 10, the semaphore 12, and the common resource 13 as a unit of transmitting/receiving data and a control signal or the like. The semaphore 12 controls the possessory right of the common resource 13. The common resource 13 is a circuit having a specific function such as a memory, a timer, an analog-to-digital conversion circuit, a digital-to-analog conversion circuit, or a coprocessor. The common resource 13 is a hardware resource commonly used by a plurality of processes executed on the processor unit 10.

In the semiconductor device 1 according to the first embodiment, the processor unit 10 has a processor core 20 and a semaphore management unit 21. In the processor core 20, a virtual machine management unit 30, a first virtual machine (for example, a virtual machine 31), and a second virtual machine (for example, a virtual machine 32) are configured. The virtual machine management unit 30 and the virtual machines 31 and 32 are logically configured on the processor core 20 by functions of basic software such as an operating system (OS) executed by the processor core 20.

In the processor core 20, the virtual machines 31 and 32 perform different processes. In the processor core 20, the virtual machine management unit 30 switches between operation of the virtual machine 31 and operation of the virtual machine 32 in a time division manner. The virtual machine management unit 30 switches the virtual machines to operate according to an interrupt signal generated from the semaphore management unit 21 which will be described later. In the following description, a process performed by the virtual machine 31 is called a first process, and a process performed by the virtual machine 32 is called a second process. At the time of obtaining the possessory right on a common resource necessary for the process to the semaphore 12 in accordance with each of the processes, each of the virtual machines 31 and 32 generates a possessory right acquisition request to the semaphore 12.

In the semiconductor device 1 according to the first embodiment, in the case of generating a possessory right acquisition request to the semaphore 12, an identifier specifying a virtual machine which generated the possessory right acquisition request is included as semaphore information in an instruction for a possessory right acquisition request. The possessory right acquisition request can be made in various units such as an application software unit or a step unit of each of codes configuring software.

In the case of making the possessory right acquisition request on the application software unit, semaphore information includes an identifier for specifying application software. In the case of using an identifier for specifying application software, it is preferable to associate the application software and a virtual machine with each other.

In the case of making the possessory right acquisition request in a step unit of codes configuring software, the semaphore information includes an identifier for specifying application software. For example, when it is desired to perform processes 0 to 3 in order, the value of an identifier during execution of the process 0 is set to 0, after completion of the process 0, the count value of the counter in the semaphore 12 is incremented. The virtual machine starts the process 1 according to the change of the count value of the semaphore to 1. After that, the virtual machine executes the processes until the process 3 by repeating similar processes. In the case of setting an identifier every step, the virtual machines and the steps have to be associated.

The semaphore management unit 21 has a spin control unit 40 and a register 41. The spin control unit 40 performs a possessory right acquisition process to the semaphore 12 on the basis of a possessory right acquisition request generated from the virtual machine 31 or 32. In the register 41, various information used in the possessory right acquisition process performed by the spin control unit 40 is stored. In the example illustrated in FIG. 1, a spin lock control register 51, a spin lock status register 52, a semaphore address register 53, semaphore comparison data register 54, and semaphore lock data register 55 are provided. The register 41 is also provided with a not-illustrated register, and information which is not illustrated in FIG. 1 is also used in the process of the spin control unit 40. For example, the spin control unit 40 uses various timers in the possessory right acquiring process, and the register 41 is provided with a register storing set values for measuring time in the timers. Concrete operation of the semaphore management unit 21 including the operation of the spin control unit 40 will be described later.

In the spin lock control register 51, a start flag is stored. A virtual machine making a request of acquiring the common resource 13 sets the start flag to "1". In response to the start flag which becomes "1", the spin control unit 40 starts operation. Since the start flag "1" indicates that the semaphore management unit 21 is in a busy state, in the case where the start flag is "1" at the time of making the possessory right acquisition request, the virtual machine operates on recognition that the possessory right acquisition request failed.

In the spin lock status register 52, a value indicating an acquisition state of the possessory right of the common resource 13 or a result of the spin lock process is stored. For example, the value stored in the spin lock status register 52 becomes a success value when acquisition of the possessory right of the common resource 13 succeeds, becomes a "fail" value when acquisition of the possessory right of the common resource 13 fails, and becomes a timeout value when acquisition of the possessory right does not succeed even after performing the spin lock process of repetitively performing the possessory right acquiring process to acquire the possessory right of the common resource 13 more than specified time.

In the semaphore address register 53, the address value of the semaphore 12 is stored. When there are a plurality of semaphores 12, a set of the spin lock control register 51, the spin lock status register 52, the semaphore address register 53, the semaphore comparison data register 54, and the semaphore lock data register 55 is provided for each semaphore.

In the semaphore comparison data register 54, a value indicating a state where the semaphore 12 does not give a possessory right to any of processes or virtual machines is stored as an expectation value. For example, when the semaphore 12 does not give the possessory right of the common resource 13 to any of processes or virtual machines, the value "0" is stored in the semaphore comparison data register 54.

In the semaphore lock data register 55, information (for example, semaphore lock data) of a process of executing the spin lock process or the identifier of a virtual machine is stored.

In the case where there is a possessory right acquisition request from the processor unit 10, when the possessory right of the common resource 13 is not assigned to any process (for example, virtual machine), the semaphore 12 gives the possessory right of the common resource 13 to the virtual machine which generated the possessory right acquisition request. In the case where there is a possessory right acquisition request from the processor unit 10, when the possessory right of the common resource 13 is assigned to any process (for example, virtual machine), the semaphore 12 rejects to give the possessory right of the common resource 13 to the virtual machine which generated the possessory right acquisition request. The semaphore 12 has a register storing identification information which identifies a process or virtual machine to which the possessory right of the common resource 13 is given. The identification information will be called semaphore information (for example, semaphore lock data). In the semiconductor device 1 according to the first embodiment, issuance of a possessory right acquisition request to the semaphore 12 is performed by the semaphore management unit 21 in place of the process or virtual machine. The details of the semaphore information will be described in the detailed description of the semaphore management unit 21.

The operation of the semaphore management unit 21 will be described in detail. When the request to acquire the possessory right of the common resource 13 is sent from the virtual machine 31 or 32, the semaphore management unit 21 executes the acquiring process on the semaphore 12. When the possessory right of the common resource 13 is obtained, a success value indicating success of the acquisition is stored in the spin lock status register 52.

On the other hand, when the acquiring process is executed on the semaphore 12 in accordance with a request to acquire the possessory right of the common resource 13 from the virtual machine 31 or 32 and, as a result, acquisition of the possessory right of the common resource 13 fails, the semaphore management unit 21 stores a "fail" value indicating failure of acquisition into the spin lock status register 52. The fail value is, for example, a value indicating a state where the semaphore management unit 21 performs the spin lock process. When the possessory right of the common resource 13 fails, the semaphore management unit 21 performs the spin lock process of repetitively performing the possessory right acquiring process.

Further, when one of the virtual machines 31 and 32 fails in acquisition of the possessory right of the common resource 13, the semaphore management unit 21 instructs the virtual machine management unit 30 to switch the virtual machine which is in the operation state from the one of the virtual machines to the other virtual machine, and repeats the process of acquiring the possessory right of the common resource 13 by the one of the virtual machines. In response to a change from the failure to success of the common resource possessory right acquisition state on the one of the virtual machines, the semaphore management unit 21 instructs the virtual machine management unit 30 to switch the virtual machine which is in the operation state from the other virtual machine to the one of the virtual machines.

Figure 2:
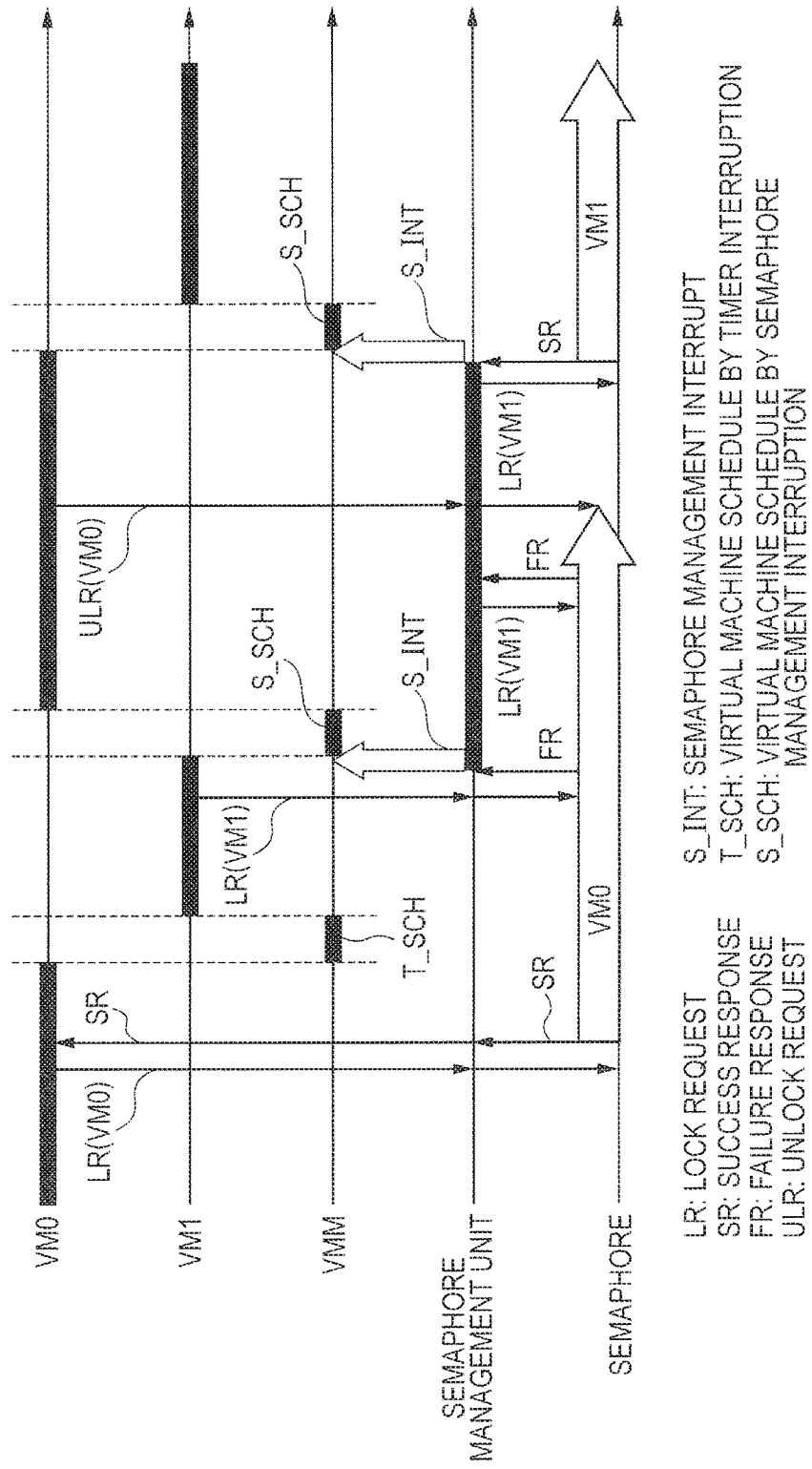
FIG. 2 is a timing chart explaining the operation of the semiconductor device according to the first embodiment.

Subsequently, the operation of the semiconductor device 1 according to the first embodiment will be described. FIG. 2 is a timing chart explaining operation of the semiconductor device 1 according to the first embodiment. In the example illustrated in FIG. 2, the virtual machine management unit 30 is indicated as VMM, the virtual machine 31 is indicated as VM1, and the virtual machine 32 is indicated as VM2.

The example in FIG. 2 illustrates the case that the virtual machine which operates is switched from the virtual machine 31 to the virtual machine 32 in a state where the virtual machine 31 obtains the possessory right of the common resource 13, and the state where the possessory right of the common resource 13 is obtained by the virtual machine 31 is maintained.

Referring to FIG. 2, the details of the operation of the semiconductor device 1 according to the first embodiment will be described. In the example illustrated in FIG. 2, first, the virtual machine 31 generates a possessory right acquisition request (lock request LR (VM0) in FIG. 2) requesting the possessory right of the common resource 13 to the semaphore 12. In response to the lock request, the semaphore management unit 21 gives an exclusive load instruction (load link) to the semaphore 12 and reads semaphore lock data stored in the semaphore 12 at the present time point. The semaphore management unit 21 stores semaphore information as the identifier of the virtual machine 31 included in the lock request received from the virtual machine 31 as semaphore lock data into the semaphore lock data register 55. In the example illustrated in FIG. 2, the semaphore 12 sends back the value "0" in response to the exclusive load instruction since the possessory right of the common resource 13 is not given to any of the virtual machines at this time point. By the value, the semaphore management unit 21 recognizes that the semaphore 12 does not give the possessory right of the common resource 13 to any of the virtual machines, and writes the semaphore information supplied from the virtual machine 31 into the semaphore 12 by using an exclusive store instruction (store conditional). Success of the exclusive store instruction is indicated as success response SR in FIG. 2. The semaphore management unit 21 writes a success value into the spin lock status register 52 on the basis of the response request SR. The virtual machine 31 refers to the success value and recognizes that the possessory right of the common resource 13 is obtained. Consequently, the virtual machine 31 continues a process using the common resource 13.

After that, at a predetermined virtual machine switching timing, the virtual machine management unit 30 switches the virtual machine which operates from the virtual machine 31 to the virtual machine 32 (T_SCH in FIG. 2). The virtual machine 32 generates a possessory right acquisition request on the common resource 13 (the lock request LR (VM1) in FIG. 2) in accordance with the process. At this time, the semaphore management unit 21 stores the semaphore information as the identifier of the virtual machine 31 included in the lock request received from the virtual machine 32 as semaphore lock data into the semaphore lock data register 55. In accordance with the lock request LR (VM1), the semaphore management unit 21 gives an exclusive load instruction to the semaphore 12 and reads semaphore lock data stored in the semaphore 12 at this time point. At this time, in the example illustrated in FIG. 2, the semaphore 12 gives the possessory right of the common resource 13 to the virtual machine 31, so that the semaphore 12 sends back semaphore lock data indicating that the possessory right is given to the virtual machine 31 to the semaphore management unit 21 in accordance with the exclusive load instruction. Consequently, the semaphore management unit 21 recognizes that the semaphore 12 gives the possessory right of the common resource 13 to the virtual machine 31. In the example illustrated in FIG. 2, using the exclusive store instruction, the semaphore information given from the virtual machine 31 is written in the semaphore 12. The success of the exclusive store instruction is illustrated in FIG. 2 that the semaphore 12 sends back semaphore lock data indicating that the exclusive right is given to the virtual machine 31, as a failure response FR.

In the semaphore management unit 21, in response to reception of the failure response FR, the spin control unit 40 stores the fail value into the spin lock status register 52. In response to reception of the failure response FR, the spin control unit 40 also generates an interrupt signal (semaphore interrupt S_INT) to the virtual machine management unit 30. The virtual machine management unit 30 switches the virtual machine which is operated in response to notification of the semaphore interrupt S_INT from the virtual machine 32 to the virtual machine 31 (S_SCH in FIG. 2). It makes the virtual machine 31 restart the operation. In response to writing of the fail value in the spin lock status register 52, the spin control unit 40 starts spin lock process. In the spin lock process, the semaphore management unit 21 periodically performs the process of acquiring the possessory right of the common resource 13 based on the possessory right acquisition request generated from the virtual machine 32 to the semaphore 12.

In the example illustrated in FIG. 2, the virtual machine 31 which restarts operation in the period that the semaphore management unit 21 continues the spin lock process generates a possessory right release request (unlock request ULR (VM0) in FIG. 2) to the semaphore 12 via the semaphore management unit 21. More concretely, the semaphore management unit 21 which receives the unlock request ULR (VM0) generates an exclusive store instruction of rewriting the semaphore lock data of the semaphore 12 to "0" to the semaphore 12. It makes the semaphore 12 release the possessory right of the common resource 13 given to the virtual machine 31. When the semaphore management unit 21 succeeds in acquisition of the possessory right regarding to the common resource 13 by the following spin lock process, a success response SR is sent back from the semaphore 12. More concretely, the semaphore management unit 21 writes semaphore lock data stored in the semaphore lock data register 55 to the semaphore 12 by the exclusive store instruction and, in response to success of the writing, the virtual machine 32 recognizes that the possessory right of the common resource 13 could be obtained. In FIG. 2, success of the semaphore management unit 21 in writing the semaphore lock data indicates as the success response SR.

In response to that the spin control unit 40 receives the success response SR, the semaphore management unit 21 stores a success value in the spin lock status register 52. According to the reception of the success response SR, the spin control unit 40 generates an interrupt signal (semaphore interrupt S_INT) to the virtual machine management unit 30. The virtual machine management unit 30 switches the virtual machine which is operated when the semaphore interrupt S_INT is notified from the virtual machine 31 to the virtual machine 32 (S_SCH in FIG. 2). It makes the operation restart in a state where the virtual machine 32 can use the common resource 13. The spin control unit 40 starts the spin lock process in response to writing of the success value into the spin lock status register 52. Further, after rewriting the value of the start flag of the spin lock control register 51 from "1" to "0", the spin control unit 40 finishes the spin lock process and shifts to a standby state.

Figure 3:
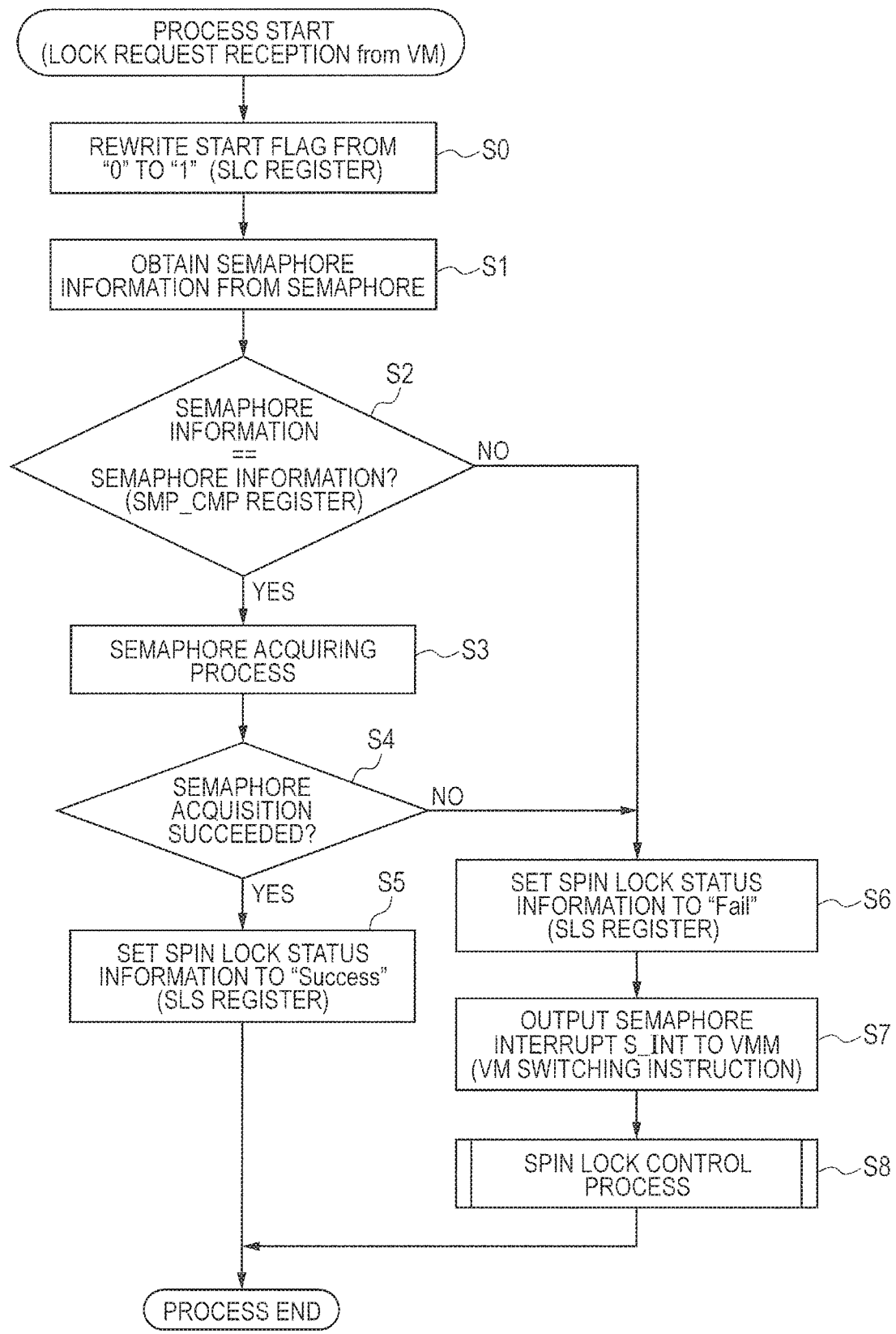
FIG. 3 is a flowchart explaining the operation of a semaphore management unit according to the first embodiment.
Figure 4:
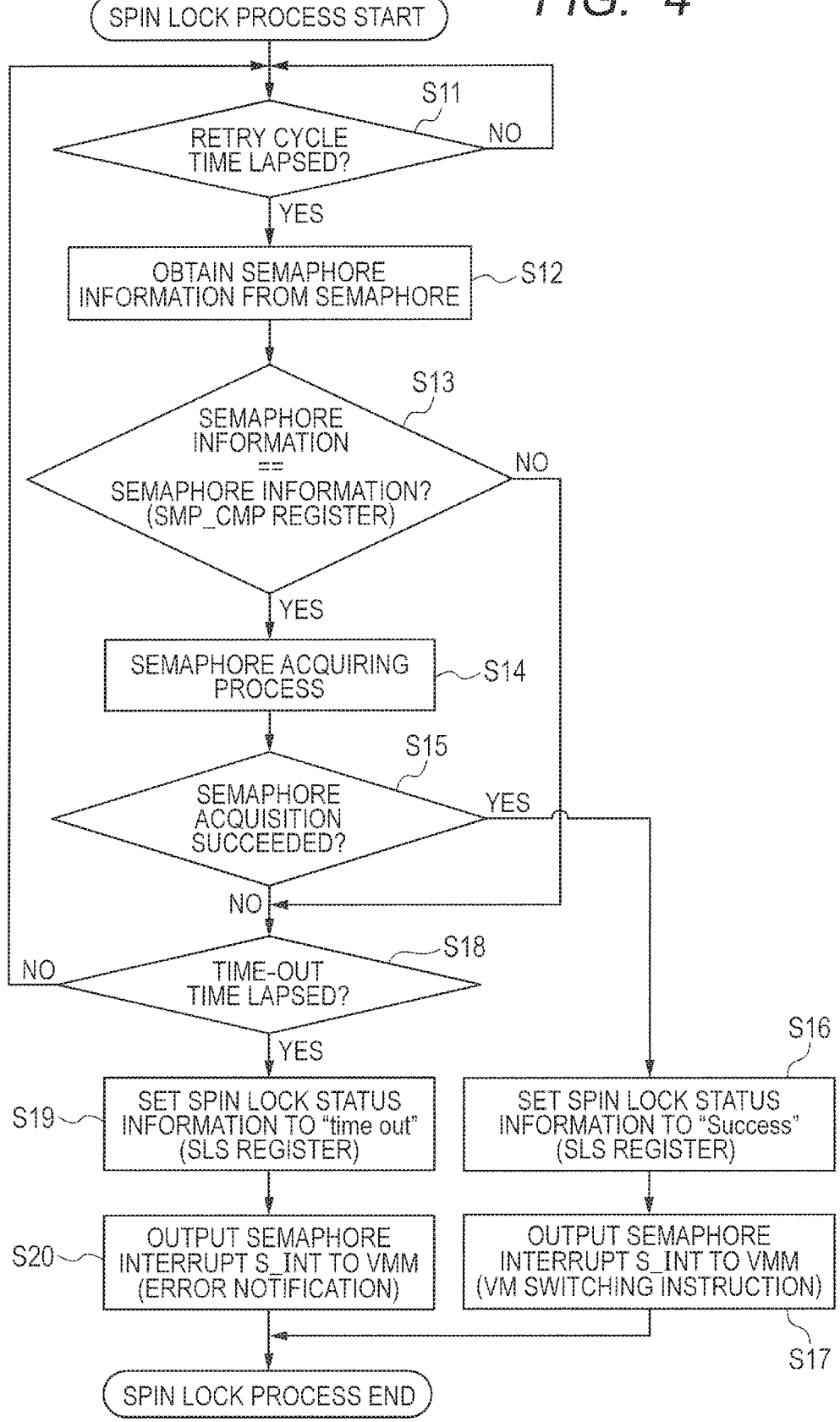
FIG. 4 is a flowchart explaining spin lock process of the semaphore management unit according to the first embodiment.

Subsequently, the operation of the semaphore management unit 21 will be described in detail with reference to the flowchart. FIG. 3 is a flowchart illustrating operation of the semaphore management unit 21 according to the first embodiment. In the description of FIGS. 3 and 4, acquisition of the possessory right on the common resource 13 is expressed as semaphore acquisition.

As illustrated in FIG. 3, the semaphore management unit 21 starts processes in accordance with reception of a lock request from a virtual machine. In the semaphore management unit 21, when the spin control unit 40 starts processing, the value of the start flag of the spin lock control register 51 is rewritten from "0" to "1" (step S0). Although not illustrated, in step S0, the semaphore management unit 21 stores semaphore information regarding the virtual machine which generated the lock request in the semaphore lock data. Subsequently, the spin control unit 40 obtains semaphore information (for example, semaphore lock data) held in the semaphore 12 from the semaphore 12 (step S1). In step S1, the spin control unit 40 performs reading process using the exclusive load instruction (load link). The spin control unit compares the semaphore information obtained from the semaphore 12 and the semaphore information stored in the semaphore comparison data register 54 (step S2). In the examples illustrated in FIGS. 3 and 4, in the semaphore comparison data register 54, the value (for example, the value "0") when the semaphore management unit 21 does not give the possessory right of the common resource 13 to any of the virtual machines is set.

When the two pieces of information match in the comparing process of step S2, the spin control unit 40 performs semaphore acquiring process by writing semaphore information (for example, semaphore lock data stored in the semaphore lock data register 55) given from the virtual machine into the semaphore 12 by using an exclusive store instruction (store instruction) (step S3). In response to success in the acquisition of semaphore, the spin control unit 40 sets the value (for example, spin lock status information) of the spin lock status register 52 as a success value (steps S4 and S5).

On the other hand, in the case where the two pieces of information do not match in the comparing process of step S2 or in the case where it is determined in step S4 that acquisition of semaphore fails, the spin control unit 40 updates the value (for example, the spin lock status information) of the spin lock status register 52 with the fail value (step S6). As an example that the semaphore acquisition fails in step S4, a failure occurs when any process or virtual machine acquires the semaphore in a period after recognition of the semaphore lock data of the semaphore 12 in step S2 and before the semaphore acquisition process in step S4. The spin control unit 40 outputs the semaphore interrupt S_INT to the processor core 20 (step S7). It switches the virtual machine which operates on the processor core 20 from the virtual machine 32 to the virtual machine 31. After that, the spin control unit 40 performs the spin lock process (step S8).

The spin lock process in step S8 will be described in detail. FIG. 4 is a flowchart illustrating spin lock process of the semaphore management unit 21 according to the first embodiment. As illustrated in FIG. 4, in the spin lock process, until predetermined retry cycle time elapses, the spin control unit 40 waits the process of acquiring the possessory right of the common resource 13 (step S11). After lapse of the retry cycle time, the spin control unit 40 starts the process of acquiring the possessory right of the common resource 13.

In the semaphore acquiring process, first, the spin control unit 40 obtains semaphore information held in the semaphore 12 from the semaphore 12 by using an exclusive load instruction (load link) (step S12). The spin control unit 40 compares the semaphore information obtained from the semaphore 12 and the value "0" stored in the semaphore comparison data register 54 (step S13).

When the two pieces of information match in the comparing process of step S13, the spin control unit 40 performs semaphore acquiring process by writing the semaphore information given from the virtual machine (for example, semaphore lock data stored in the semaphore lock data register 55) into the semaphore 12 by using an exclusive store instruction (store conditional) (step S14). The spin control unit 40 sets the value (for example, spin lock status information) of the spin lock status register 52 to a success value in accordance with success in acquisition of the semaphore (steps S15 and S16). The spin control unit 40 outputs the semaphore interrupt S_INT to the processor core 20 (step S17). It switches the virtual machine operating on the processor core 20 from the virtual machine 31 to the virtual machine 32.

On the other hand, when the two pieces of information do not match in the comparing process of step S13 or when it is determined in step S15 that acquisition of semaphore fails, the spin control unit 40 repeats the processes from step S11 to step S15 until timeout time which is preliminarily set lapses (step S18). The timeout time is provided to prevent the process from not going forward and, preferably, set to be sufficiently longer than time in which another virtual machine cancels the semaphore acquisition state. In the case where the semaphore management unit 21 cannot acquire semaphore even after lapse of the timeout time, the spin control unit 40 updates the value (for example, spin lock status information) of the spin lock status register 52 with the timeout value (step S19). The spin control unit 40 outputs the semaphore interrupt S_INT to the processor core 20, and notifies the virtual machine of failure in acquisition of the semaphore (step S20). In response to completion of the process in step S20 or S17, the semaphore management unit 21 finishes the spin lock process.

In the above description, when the possessory right of the common resource 13 cannot be acquired by a virtual machine (or a predetermined process unit), the semiconductor device 1 according to the first embodiment switches the process on the processor core 20 to a virtual machine other than the virtual machine which generated the possessory right acquisition request, and performs the spin lock process which is originally performed by the virtual machine by using the semaphore management unit 21. When acquisition of the possessory right of the common resource 13 succeeds by the operation of the semaphore management unit 21, the semiconductor device 1 according to the first embodiment switches the process on the processor core 20 from the virtual machine which is in the operation state at this time point to the virtual machine which generated the possessory right acquisition request.

By such a process, the semiconductor device 1 according to the first embodiment prevents the process of the virtual machine from becoming retarded when the virtual machine performs the spin lock process, and can increase the processing efficiency of the semiconductor device.

For example, in the technique of the patent literature 1, virtual machines alternately enter the operation state while being switched at predetermined time intervals. Consequently, in the technique of the patent literature 1, in the case where the process switches from one of virtual machines to the other virtual machine when the one of virtual machines obtains the possessory right from semaphore, the other virtual machine cannot obtain the possessory right of the common resource from the semaphore, and performs the spin lock process of repeating the process of obtaining the exclusion right. Consequently, the technique of the patent literature 1 has a problem such that, until the possessory right is released by one of virtual machines, the spin lock process of the other virtual machine continues and the process of the other virtual machine does not go forward. However, in the semiconductor device 1 according to the first embodiment, the problem that the process of the virtual machine does not go forward like in the technique described in the patent literature 1 is solved.

Second Embodiment

Figure 5:
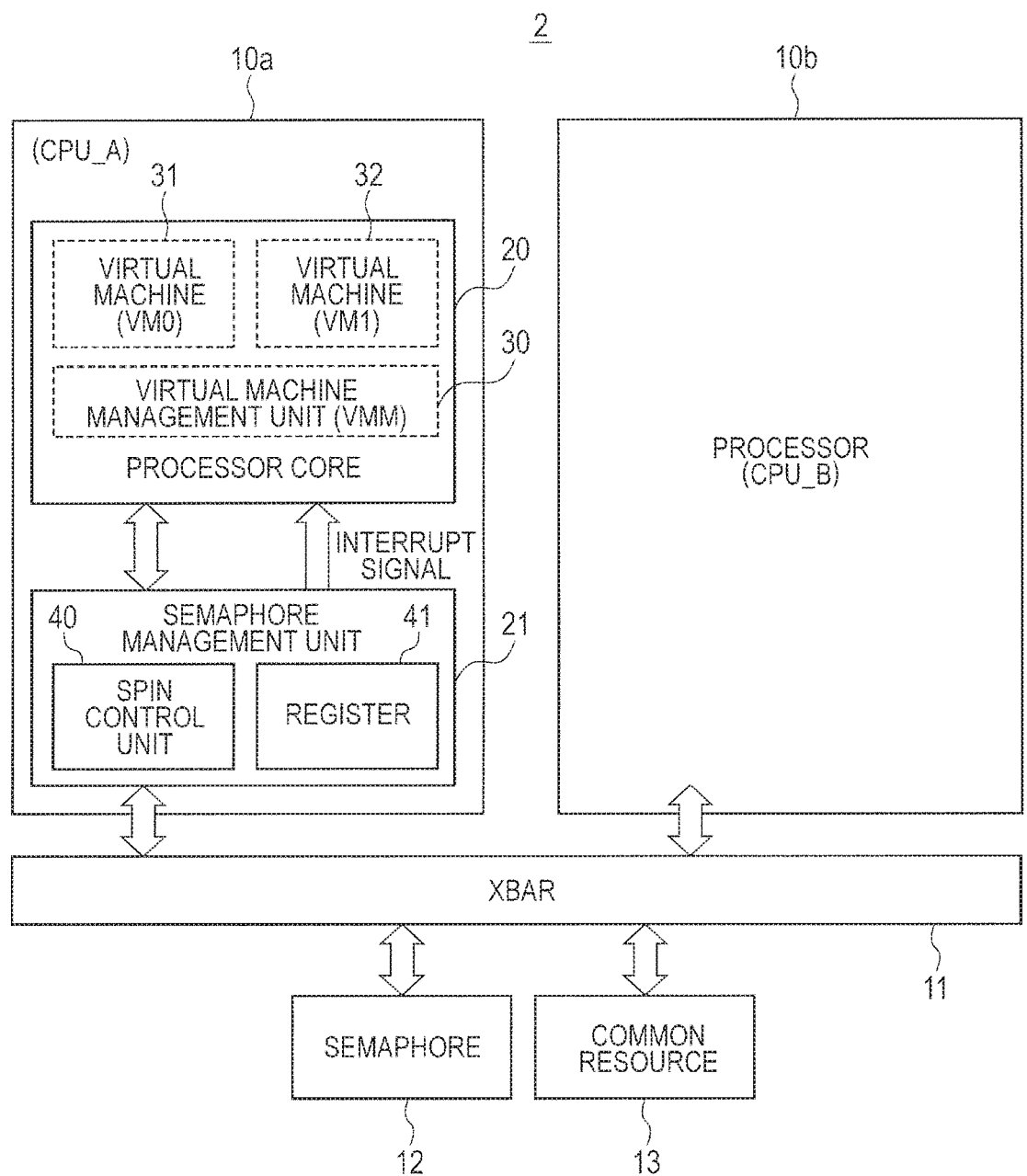
FIG. 5 is a block diagram of a semiconductor device according to a second embodiment.

In a second embodiment, a semiconductor device 2 as another mode of the semiconductor device 1 according to the first embodiment will be described. FIG. 5 is a block diagram of the semiconductor device 2 according to the second embodiment. The same reference numerals as those in the first embodiment are designated to the same components as those described in the first embodiment and repetitive description will not be given.

As illustrated in FIG. 5, the semiconductor device 2 according to the second embodiment is obtained by adding a processor unit 10b to the semiconductor device 1 according to the first embodiment. In FIG. 5, the reference numeral of the processor unit 10 illustrated in FIG. 1 is set as 10b. The processor unit 10b may be one in which virtual machines are logically configured like the processor unit 10 or a processor unit in which no virtual machine is configured and which performs a single operation. That is, in the semiconductor device 2 according to the second embodiment, it is sufficient that at least one of the processor units 10a and 10b has the same configuration as that of the processor unit 10.

Figure 6:
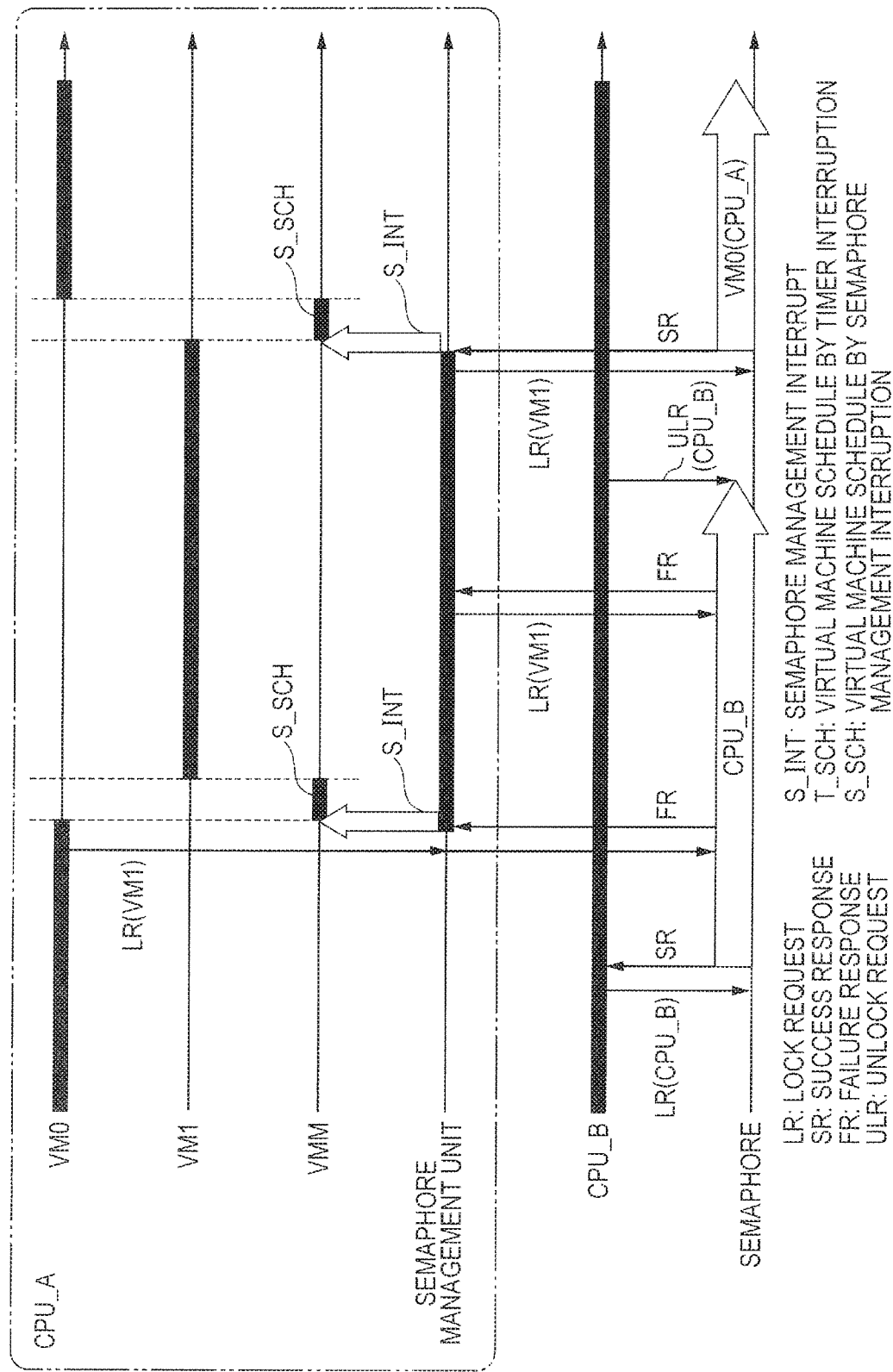
FIG. 6 is a timing chart explaining operation of the semiconductor device according to the second embodiment.

Subsequently, the operation of the semiconductor device 2 according to the second embodiment will be described. FIG. 6 is a timing chart illustrating operation of the semiconductor device according to the second embodiment. In the example illustrated in FIG. 6, the processor unit 10b (CPU_B in FIG. 6) acquires the possessory right of the common resource 13 and performs a process using the common resource 13.

After that, the virtual machine 31 of the processor unit 10a (CPU_A in FIG. 6) generates a possessory right acquisition request (lock request LR (VM0) in FIG. 6) to the semaphore 12. However, the possessory right of the common resource 13 is already acquired by the processor unit 10b, so that the semaphore management unit 21 generates the semaphore interrupt S_INT to switch the virtual machine which operates on the processor core 20 from the virtual machine 31 to the virtual machine 32. The semaphore management unit 21 starts the spin lock process.

After that, the processor unit 10b releases the possessory right of the common resource 13. When the semaphore management unit 21 succeeds in acquisition of the possessory right of the common resource 13, the semaphore management unit 21 outputs the semaphore interrupt S_INT. In response to the semaphore interrupt S_INT, the virtual machine management unit 30 resets the virtual machine operating on the processor core 20 from the virtual machine 32 to the virtual machine 31. Consequently, the virtual machine 31 can continue the process using the common resource 13.

As described above, in the semiconductor device 2 according to the second embodiment, the processor unit 10b different from the processor unit 10a provided with the semaphore management unit 21 is provided. Also in such a case, since the processor unit 10a is provided with the semaphore management unit 21, the semiconductor device 2 according to the second embodiment can prevent the processes of the virtual machines 31 and 32 from being retarded and increase the processing efficiency of the semiconductor device.

The configuration of the semiconductor device 2 according to the second embodiment is summarized as follows. The semiconductor device has a plurality of processors 10a and 10b, the common resource 13 shared by the plurality of processors, and the semaphore 12 which gives the possessory right of the common resource 13 every unit of processes performed by the plurality of processors. When acquisition of the possessory right of the common resource 13 by a first process performed by the processor of the semaphore management unit 21 fails, the semaphore management unit 21 switches the process from the first process to the second process and repeats the process of acquiring the possessory right to the semaphore until the possessory right of the common resource 13 can be acquired by the first process. In response to a change from failure to success of the acquisition of the possessory right of the common resource by the first process, the semaphore management unit 21 switches the process performed by the processor from the second process to the first process.

The processor performing first and second processes has first and second virtual machines and a virtual machine management unit controlling the operation while switching the first and second virtual machines.

Although the present invention achieved by the inventors herein has been concretely described on the basis of the embodiments, obviously, the present invention is not limited to the foregoing embodiments but can be variously changed without departing from the gist.

What is claimed is:

1. A semiconductor device comprising:
a processor in which first and second virtual machines are logically configured;
a common resource shared by the first and second virtual machines; and
a semaphore which gives possessory right of the common resource to one of the first and second virtual machines,
wherein the processor comprises:
a virtual machine management unit switching a state of the processor between a first state and a second state, the first state being a state in which the first virtual machine is in an operation state and the second virtual machine is in a non-operation state, and the second state being a state in which the first virtual machine is in a non-operation state and the second virtual machine is in an operation state; and
a semaphore management unit,
wherein the semaphore management unit, when an acquisition request of the possessory right of the common resource from the first virtual machine is failed in the first state, instructs the virtual machine management unit to switch the state of the processor from the first state to the second state, and repeats the acquisition request in the second state, and
wherein, when the acquisition request by the semaphore management unit is succeeded in the second state, the semaphore management unit instructs the virtual machine management unit to switch the state of the processor from the second state to the first state.

2. The semiconductor device according to claim 1, wherein the first virtual machine determines whether the possessory right is obtained or not with reference to a spin lock status register provided for the semaphore management unit.

3. The semiconductor device according to claim 1, wherein when an acquisition request of the possessory right of the common resource is issued from the second virtual machine during processing the acquisition request by the semaphore management unit, the semaphore management unit notifies the second virtual machine of a busy status.

4. A semiconductor device comprising:
a processor in which first and second virtual machines are logically configured;
a common resource shared by the first and second virtual machines; and
a semaphore which gives possessory right of the common resource to one of the first and second virtual machines,
wherein the processor comprises:
a virtual machine management unit switching a virtual machine in an operation state between the first and second virtual machines; and
a semaphore management unit,
wherein the semaphore management unit, when one of the first and second virtual machines fails in acquisition of the possessory right of the common resource, instructs the virtual machine management unit to switch the virtual machine which is in the operation state from the one of the virtual machines to the other virtual machine and repeats process of acquiring the possessory right of the common resource by the one of the virtual machines,
wherein, in response to a change to success from the failure in the acquisition of the possessory right of the common resource regarding the one of the virtual machines, the semaphore management unit instructs the virtual machine management unit to switch the virtual machine which is in the operation state from the other virtual machine to the one of the virtual machines,
wherein the semaphore management unit has a semaphore comparison data register storing first semaphore information regarding the virtual machine to which the possessory right is given by the semaphore, and
wherein the semaphore management unit compares the first semaphore information stored in the semaphore comparison data register with second semaphore information generated to the semaphore from the virtual machine which requests acquisition of the possessory right to the semaphore and, when the first semaphore information and the second semaphore information do not match, periodically repeats acquisition of semaphore using the second semaphore information.

5. The semiconductor device according to claim 4, wherein the second semaphore information includes at least one of a virtual machine identifier identifying a virtual machine which generated the second semaphore information, an application identifier identifying application software processed on the virtual machine, and a step identifier identifying a step on a code of the application software processed on the virtual machine.

6. A semiconductor device comprising:
a first processor in which first and second virtual machines are logically configured;
a second processor;
a common resource shared by the first and second of processors; and
a semaphore which gives possessory right of the common resource to one of the first virtual machine, the second virtual machine, and the second processor, wherein at least one of the plurality first and second of processors has a semaphore management unit, wherein the first processor includes a virtual machine management unit which switches a state of the first processor between a first state and a second state, the first state being a state in which the first virtual machine is in an operation state and the second virtual machine is in a non-operation state, and the second state being a state in which the first virtual machine is in a non-operation state and the second virtual machine is in an operation state, wherein the semaphore management unit, when an acquisition request of the possessory right of the common resource from the first virtual machine is failed in the first state, instructs the virtual machine management unit to switch the state of the first processor from the first state to the second state, and repeats the acquisition request in the second state, and wherein, when the acquisition request by the semaphore management unit is succeeded in the second state, the semaphore management unit instructs the virtual machine management unit to switch the state of the first processor from the second state to the first state.

* * * * *